United States Patent
Blenkinsopp et al.

(10) Patent No.: US 12,279,623 B2
(45) Date of Patent: Apr. 22, 2025

(54) PRODUCTIVITY ENHANCEMENT APPARATUS FOR POWER OPERATED SKINNING EQUIPMENT

(71) Applicants: KANDO INNOVATION LIMITED, Auckland (NZ); Keith Blenkinsopp, Auckland (NZ); Winston Wickham, Auckland (NZ)

(72) Inventors: Keith Blenkinsopp, Auckland (NZ); Winston Wickham, Auckland (NZ)

(73) Assignee: KANDO INNOVATION LIMITED, Auckland (NZ)

(*) Notice: Subject to any disclaimer, the term of this patent is extended or adjusted under 35 U.S.C. 154(b) by 431 days.

(21) Appl. No.: 17/775,086

(22) PCT Filed: Nov. 5, 2020

(86) PCT No.: PCT/NZ2020/050142
§ 371 (c)(1),
(2) Date: May 6, 2022

(87) PCT Pub. No.: WO2021/091399
PCT Pub. Date: May 14, 2021

(65) Prior Publication Data
US 2022/0394983 A1    Dec. 15, 2022

(30) Foreign Application Priority Data
Nov. 6, 2019 (NZ) .................................. 758927
Nov. 4, 2020 (NZ) .................................. 769641

(51) Int. Cl.
*A22B 5/16* (2006.01)
*A22C 21/00* (2006.01)
*A22C 25/17* (2006.01)

(52) U.S. Cl.
CPC .............. *A22B 5/166* (2013.01); *A22B 5/168* (2013.01); *A22C 21/0092* (2013.01); *A22C 25/17* (2013.01)

(58) Field of Classification Search
CPC ..... A22B 5/166; A22B 5/168; A22C 21/0092; A22C 25/17; B21D 33/00; F16P 3/144
See application file for complete search history.

(56) References Cited

U.S. PATENT DOCUMENTS

| 5,272,946 A | 12/1993 | McCullough et al. |
| 5,921,367 A * | 7/1999 | Kashioka ................ F16P 3/147 |
| | | 192/130 |

(Continued)

FOREIGN PATENT DOCUMENTS

| EP | 0 362 947 | 4/1990 |
| KR | 10-2096621 | 4/2020 |

OTHER PUBLICATIONS

International Search Report for PCT/NZ2020/050142 dated Jan. 12, 2021, 4 pages.

(Continued)

*Primary Examiner* — Omar Flores Sanchez
(74) *Attorney, Agent, or Firm* — NIXON & VANDERHYE

(57) ABSTRACT

A shaping or cutting machine, especially a skinner, at which an operator hand-feeds material to be cut or shaped toward a blade. Hand proximity detection devices are provided for operator safety; machine-vision across a surveilled volume before the blade, and conduction sensing devices. The blade is mounted on a rapidly retractable frame. Power from release of a spring physically moves the blade to a safe position if a hand is sensed. A gripping roller is driven by a rapidly stoppable motor.

7 Claims, 7 Drawing Sheets

(56) References Cited

U.S. PATENT DOCUMENTS

| | | | | |
|---|---|---|---|---|
| 6,856,852 | B1* | 2/2005 | Bruinsma | F16P 3/145 |
| | | | | 340/532 |
| 11,517,951 | B2* | 12/2022 | Rothenaicher | G05B 19/406 |
| 2006/0197020 | A1* | 9/2006 | Trzecieski | F16P 3/142 |
| | | | | 250/342 |
| 2007/0045257 | A1* | 3/2007 | Moor | B23K 26/702 |
| | | | | 219/121.86 |
| 2008/0079590 | A1* | 4/2008 | Bergman | F16P 3/147 |
| | | | | 340/686.1 |
| 2018/0098550 | A1* | 4/2018 | Grasselli | F16P 3/147 |
| 2019/0120428 | A1* | 4/2019 | Schill | F16P 3/18 |
| 2019/0145577 | A1* | 5/2019 | Blenkinsopp | F16P 3/142 |
| | | | | 83/58 |
| 2020/0164474 | A1* | 5/2020 | Grasselli | B26D 7/22 |
| 2020/0256511 | A1* | 8/2020 | Rothenaicher | F16P 3/003 |

OTHER PUBLICATIONS

Written Opinion of the ISA for PCT/NZ2020/050142 dated Jan. 12, 2021, 7 pages.

* cited by examiner

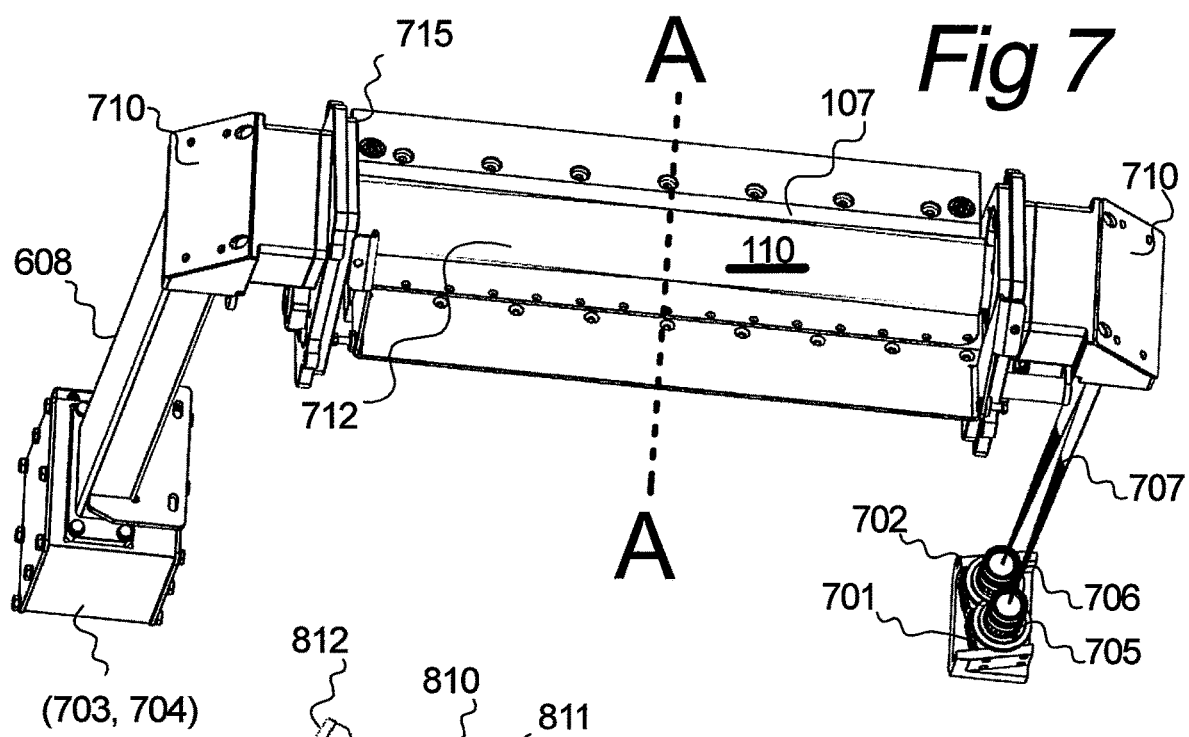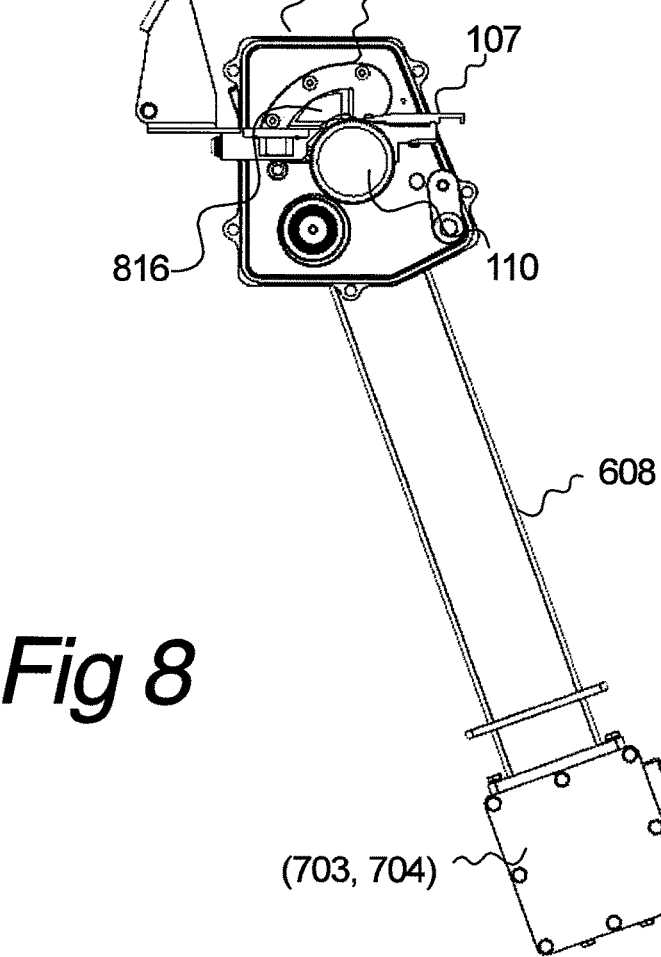

PRODUCTIVITY ENHANCEMENT APPARATUS FOR POWER OPERATED SKINNING EQUIPMENT

FIELD

A shaping or cutting machine at which an operator hand-feeds material to be cut or shaped toward a blade for which the machine is made safe by adding hand sensing and blade retraction. One embodiment is a skinning machine for meat, poultry or fish having an elongated skinning blade mounted along and just above a gripping roller. Injuries to operators' hands as they present the product to the blade are not uncommon. A productivity enhancement may result if the rate of injuries can be reduced.

Definitions

De-rinder is a name for a form of skinning machine.

Unsafe Proximity is a term describing a location of a worker's hand or glove that is dangerously close to, or in contact with a blade.

BACKGROUND

Shaping or cutting machines at which an operator hand-feeds material to be cut or shaped toward a blade are widespread, for example in the meat industry and for shaping wood. Power operated skinning equipment is widely known and widely used in parts of the food industry, to cut a layer from a workpiece to be skinned or de-rinded. See for instance "Marel", "Townsend" or "Griselli" brand skinners for meat, fish, poultry and pork. Some skinners handle whole pork carcasses, others accept hand-held items, and yet others have a conveyor feed. It is often required that an operator places his or her hands on an object to be skinned, presenting the object, with the aid of a moving platform underneath the object, towards a sharp knife blade. The moving platform is typically a powered gripping roller having a maintained surface velocity. To this date, most machines that sense and respond to the presence of a hand in a dangerous place have relied on contact sensing and bringing the roller to a halt.

Since an operator's hands are not greatly different in consistency to the material to be skinned, preventing the operator's hands from injury is difficult. It has been conventional to use a woven metal mesh as a protective layer inside conductive gloves. Assuming a surface velocity of 1 metre per second, and a glove thickness of 1 millimetre between a conductive layer (used for sensing purposes) and the operator's body, it follows that a relatively infeasible roller stopping time of 1 millisecond after contact is sensed is desired. But the material being cut is non-rigid and may continue to travel toward the blade even if the moving platform stops.

Problem to be Solved

These problems relate in particular to machines known as skinners or de-rinders. Given the problem of lack of early warning to an activation apparatus that a conductive-glove sensor provides, an appropriate solution appeared to be providing optical surveillance of a volume in front of the blade.

Given the problem of a lack of effectiveness, for hand protection, of gripping roller halting and even reversing mechanisms, an appropriate solution appeared to be providing blade retraction in event of a detected hazard.

A related problem is how to implement blade retraction with a physical mechanism having enough power to move the blade and its support from an extended working position to a retracted position within a short time, of perhaps 20 milliseconds.

A final problem relates to bringing the gripping roller to a rapid halt so that the operator's hand is not dragged to the blade.

Prior Art Review

No publication teaching effective, automatic retraction of the blade of a skinner or like machine on detection of a dangerous situation is known.

KR 102096621 to Donwoo (2 Apr. 2020) describes a skinner in which a hand touch detection unit includes a light source and "light receiving unit" are on facing sides of an upper portion of the gripping roller. They are configured to detect approach of a hand of a worker toward the blade roller. The text implies that the source and detector face each other and a beam of light passing between will be interrupted by a hand in a potentially dangerous position. A control unit for the gripping roller motor is configured to stop the roller from rotating when the hand of the worker is determined to have approached the blade roller.

U.S. Pat. No. 5,272,946 McCullough (28 Dec. 1993) describes a skinner in which a hand touch detection unit comprises a motor, a clutch and electrical connections to each of a left-hand and a right-hand conductive glove including a metal mesh. A mechanism provides that the roller becomes disengaged from the motor and is caused to reverse momentarily in order to prevent trapping of an operator's finger or glove end between the roller and the knife blade. The mechanism is triggered by contact between either glove and a component of the skinning machine, including the tooth feed roller, the knife blade, or other parts.

EP 0 362 947 to Grasselli and McCullough (priority 4 Oct. 1988) describes a skinner. Care is taken to maintain electrical connection with the worker and the conductive gloves that the worker wears.

SUMMARY OF THE INVENTION

In a first broad aspect, the invention provides a machine for shaping an item held by an operator's hand or hands; the machine having a chassis and having a blade supported at a Run Position on a blade mount, the item being advanced at a feed velocity and in a direction toward the blade, wherein the machine includes a proximity sensing device configured to detect the operator's hand when in unsafe proximity to the blade and if detected, of activating a retraction mechanism adapted to use power derived from energy held in an internal energy storage and release device to physically retract the blade from the Run Position in the direction at a velocity greater than the feed velocity and place the blade in a Safe Position.

Optionally, the only sensing device is an OFF switch.

Preferably, the internal energy storage and release device is reliant on mechanical energy stored within an elastic object to physically retract the blade.

Preferably the elastic object is a spring.

More preferably the elastic object is a compression spring.

Preferably the elastic object is a compressible spring, fixed at a first end to a body of a first actuator and at a second end to a shaft of the first actuator, and when in use and entering the Run Position, the spring is compressed by the first actuator and is held in compression by a retaining tooth, the tooth being maintained in position by a second actuator.

Preferably the second actuator is responsive to a SIGNAL derived from the proximity sensing device and on receiving the SIGNAL, will withdraw the retaining tooth, consequently releasing the compression spring and forcing a motion of the shaft.

Optionally, the first actuator may rely on a holding current to maintain the spring in compression.

Preferably, a mechanical linkage between the shaft and the physically driven blade is arranged and disposed in order to translate the motion of the shaft into physical retraction of the blade upon the blade mount; the components of the retraction device being supported from the chassis of the machine.

Optionally the blade becomes retracted to a Safe Position, inaccessible to the operator's hand where the operator is safe from injury by the blade.

In a second broad aspect, the machine is a skinner or derinding machine having a blade and used, when the blade supported at a Run Position to shape a workpiece to be skinned or de-rinded, while the workpiece is held by an operator against a powered gripping roller that carries the workpiece against the blade; the Run Position located parallel to and adjacent a top surface of the gripping roller; and a second blade position or Safe Position located close behind the gripping roller to which, when in use, the blade is physically retracted as soon as the proximity sensing device detects that the operator's hand is in unsafe proximity to the blade.

Preferably, the machine also includes a manual mechanism adapted to move the blade from the Safe Position into a third position or Cleaning Position for the blade; the mechanism including an accessible handle capable when raised of forcing the blade mount upward and away from the gripping roller.

In a first subsidiary aspect, the proximity sensing device includes an optical detection apparatus comprising a plurality of television-type cameras viewing, from each side of the blade through windows at both ends of the gripping roller, a surveilled volume that is located parallel to an axis of the gripping roller, in front of the blade; the proximity sensing device including means adapted when in use to interpret the camera outputs and, on detecting at least a portion of a hand wearing gloves coloured in a colour contrasting with a colour of the workpiece that is in unsafe proximity to the blade will generate the SIGNAL.

Preferably the machine is provided with two cameras concealed on each side of the machine; the fields of view of all the cameras being directed at the surveilled volume through windows at both ends of the gripping roller.

In one option, the proximity sensing device includes apparatus responsive to conduction of electricity from any conductive part of the machine, including the blade, through conductive gloves, said apparatus being adapted to generate the SIGNAL.

Preferably, motion of the blade from the Run Position into the Safe Position commences within 20 milliseconds after optical detection of the dangerous situation by the detection device, and is completed within 35 milliseconds.

In a second subsidiary aspect, the motor of the gripping roller comprises a controllable motor having a toothed belt drive capable of bringing the roller to a halt within 10-15 milliseconds after a motor controller connected to the motor receives the SIGNAL.

In a further broad aspect, the gripping roller is driven by a motor through a combination clutch and brake device; the device having a spindle shape, internal splines adapted to match external splines upon a shaft of the gripping roller, having a first end of the spindle adapted to provide a braking surface against a stationary surface, having a second end adapted to provide a gripping surface against a revolving surface, and having a middle part adapted to be pushed against either end by a coupling shifted by motion of the shaft of the first actuator while the internal splines retain contact with shaft of the gripping roller so that the gripping roller can be stopped independently of the motor.

Object

A first object of the invention is to provide a rapid blade retraction function for use in a shaping tool activated by a dangerously close position of the hands of an operator to the blade. A more specific object is to provide a safe working environment for an operator of a skinner machine (also called a derinding machine) by detecting a glove close to the knife blade, withdrawing the blade away from the glove and stopping the roller, while a further object is to at least to provide the public with an alternative choice of skinner.

PREFERRED EMBODIMENTS

The descriptions of the invention to be provided herein are given purely by way of example and are not to be taken as in any way limiting the scope or extent of the invention. Throughout this specification, the word "comprise" and variations such as "comprises" or "comprising" should be understood to imply the inclusion of a stated option, integer or step, but not the exclusion of any other option, integer or step. Each document, reference, patent application or patent cited in this text is expressly incorporated herein in its entirety, by way of reference. But reference to cited material or to information in the text, should not be understood as a concession that the material or information was part of the Common General Knowledge or was known in New Zealand or in any other country.

LIST OF DRAWINGS

FIG. 7 is an oblique view of the machine vision arrangement.

FIG. 8 is a cross section to show the surveilled area.

Figures 9A, 9B:
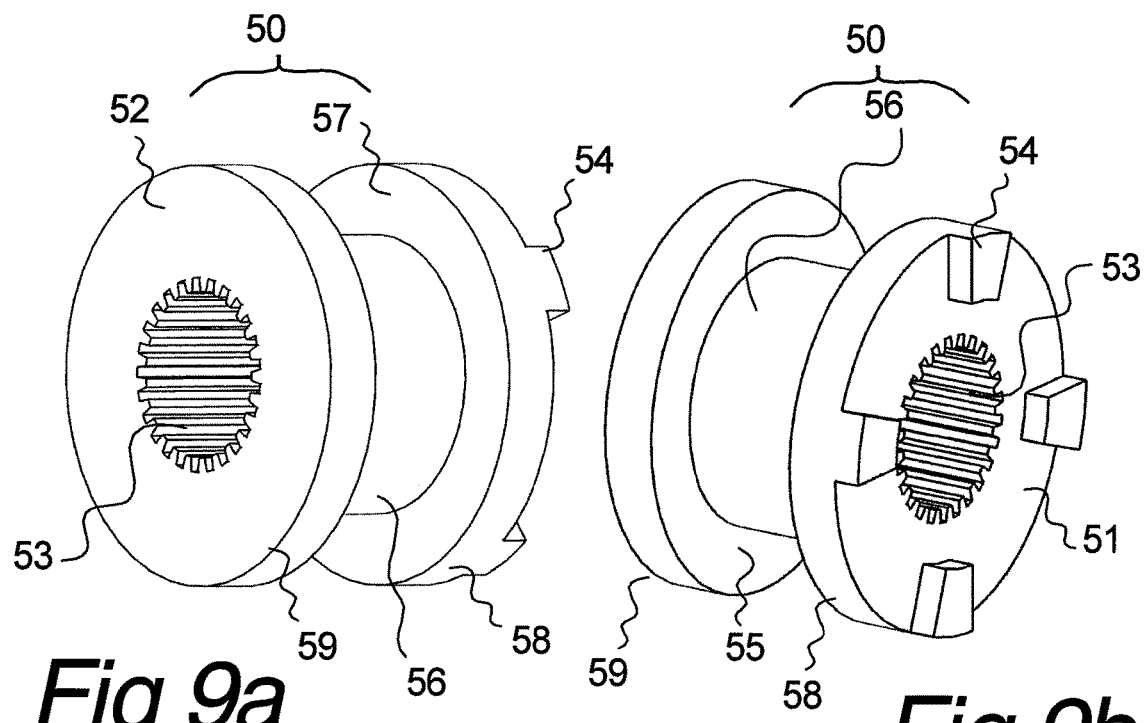

FIG. 9 (as FIGS. 9a and 9b) Two modes for the dog-clutch of Embodiment 2.

Figure 10:
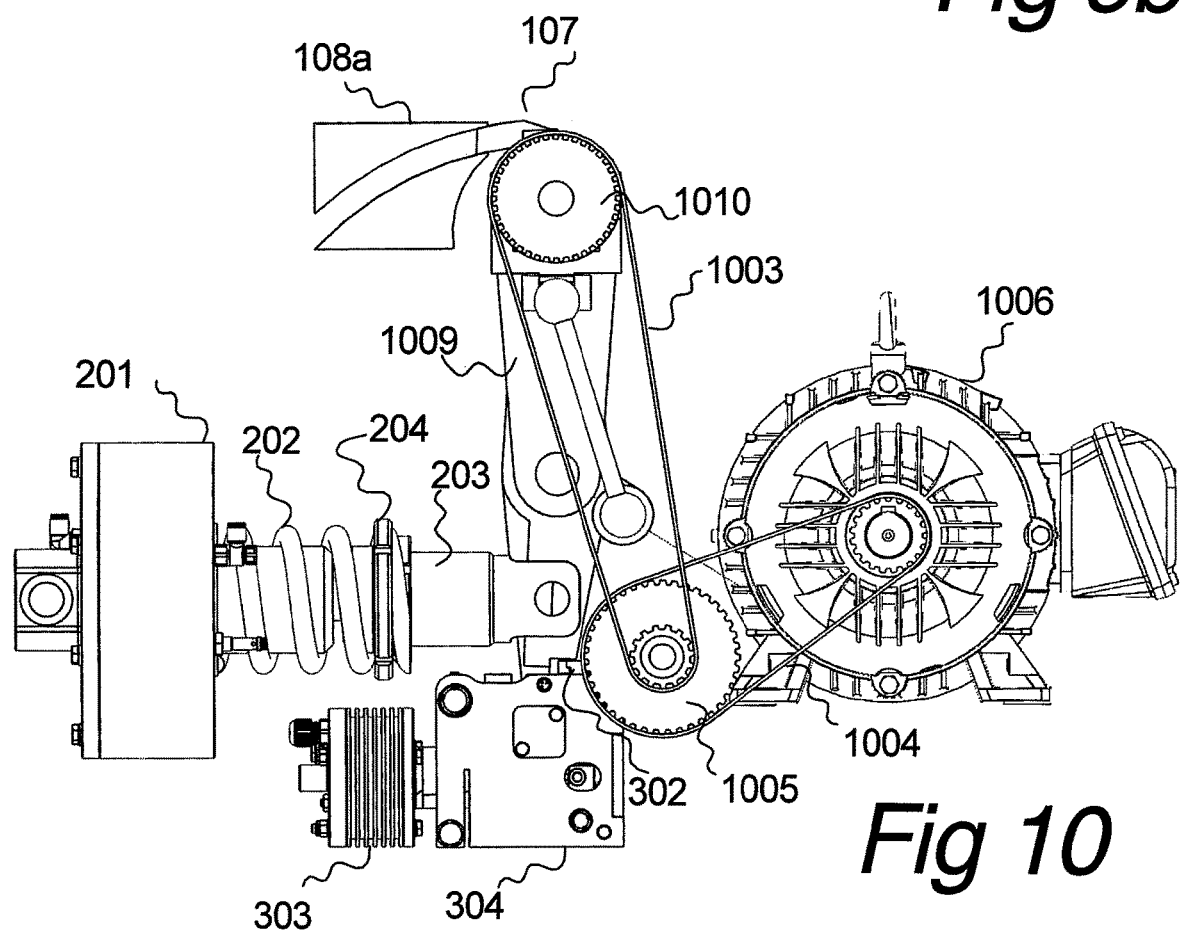

FIG. 10 is a side view of the principal components of Embodiment 2.

Figure 11:
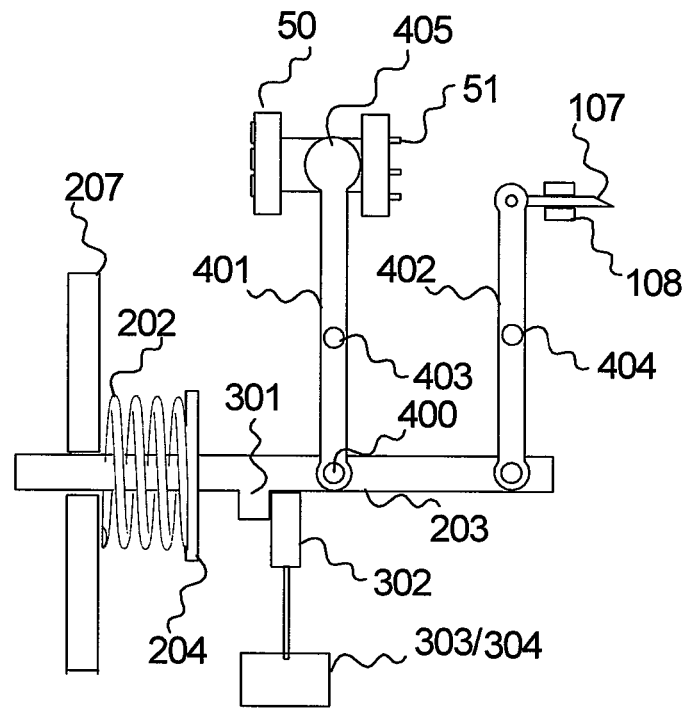

FIG. 11 is a diagram showing the Run Positions of the components.

Figure 12:
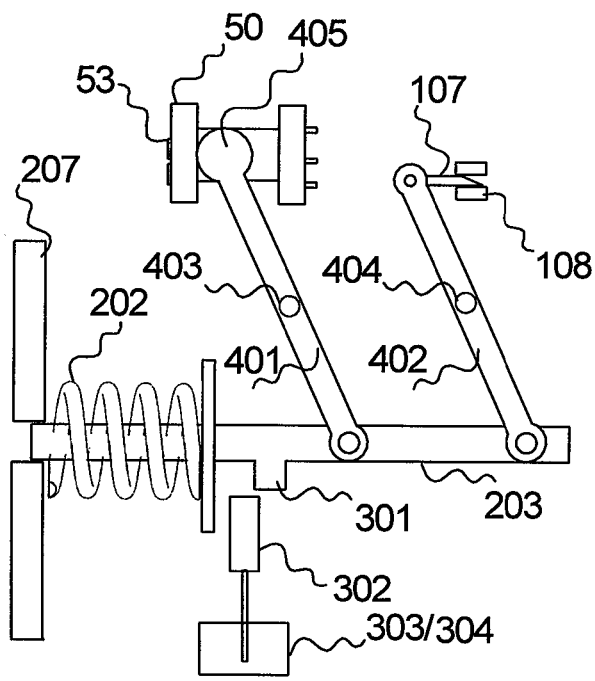

FIG. 12 is a diagram showing the Safe Positions of the components.

Figure 13:
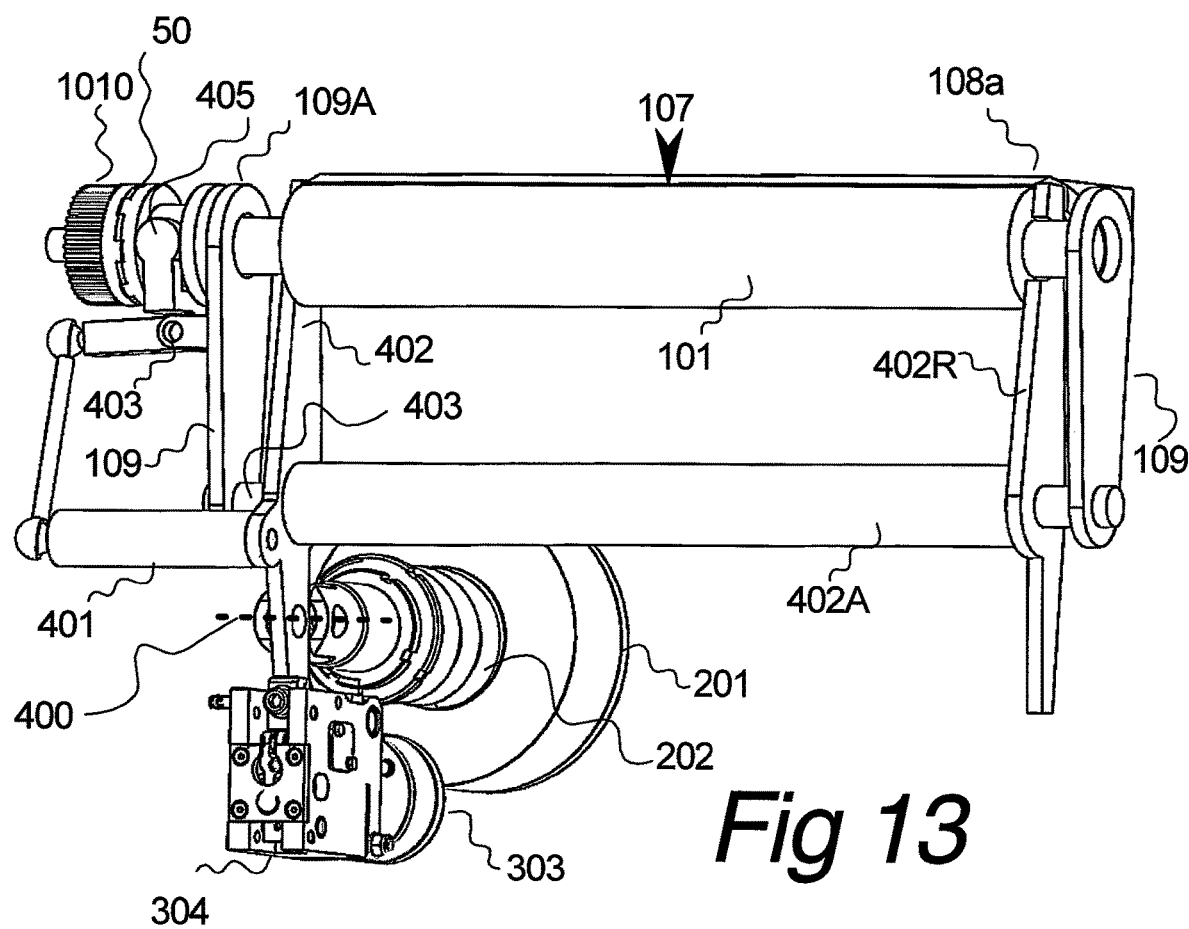

FIG. 13 is a diagram showing the blade retraction components.

Figure 14:
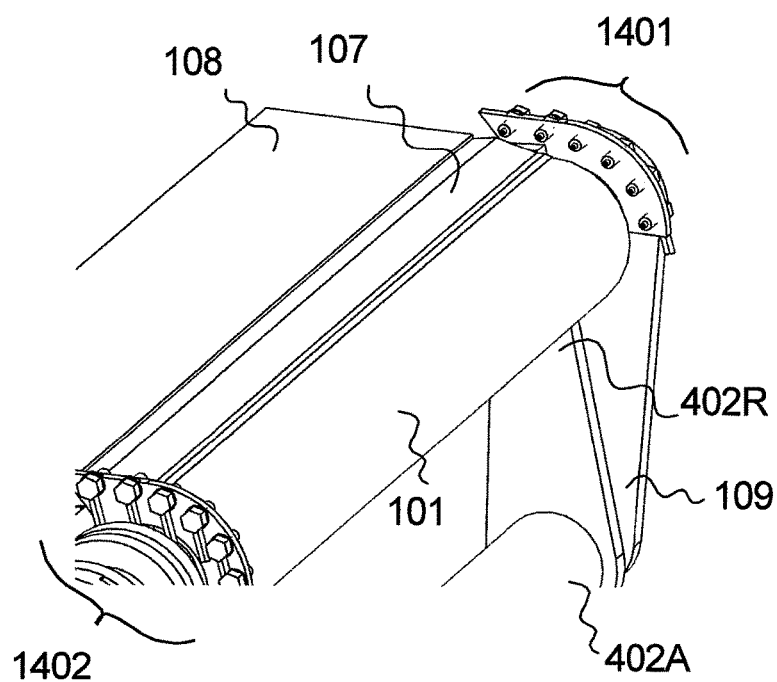

FIG. 14 is a diagram showing an array of optical beam sensors for detection of gloves.

Table 1 (in text) provides example timing measurements for Embodiment 1.

DETAILED DESCRIPTION OF THE INVENTION

The invention provides a cutting or shaping machine. The detailed examples are of a skinner or derinder. The construction of a skinner is unsafe since the worker's hand or hands can be severely traumatised by the sharp blade. The gripping roller may have engaged with the worker's hand or hands, or may have caught a glove. The worker may slip, or be fatigued. The invention provides a rapid blade retraction function so that the blade can be moved from the hands of an operator, using stored potential energy from a spring to provide a sufficiently intense burst of power to displace a mass including the blade in adequate time. Retraction of the blade begins when a dangerously close position of the hands of an operator to the blade is detected optically in a surveilled volume. If glove contact sensing is used, metal mesh gloves complete a circuit that signals a hazardous state, as is well known in the prior-art. Contact sensing is a supplementary option although some workers have become reliant on the physical security that it provides and a skinner will preferably provide both visual and contact sensing. It is possible that a skinner as above, but lacking hand or glove sensing devices is useful.

Embodiment 1

Figures 4, 4A:
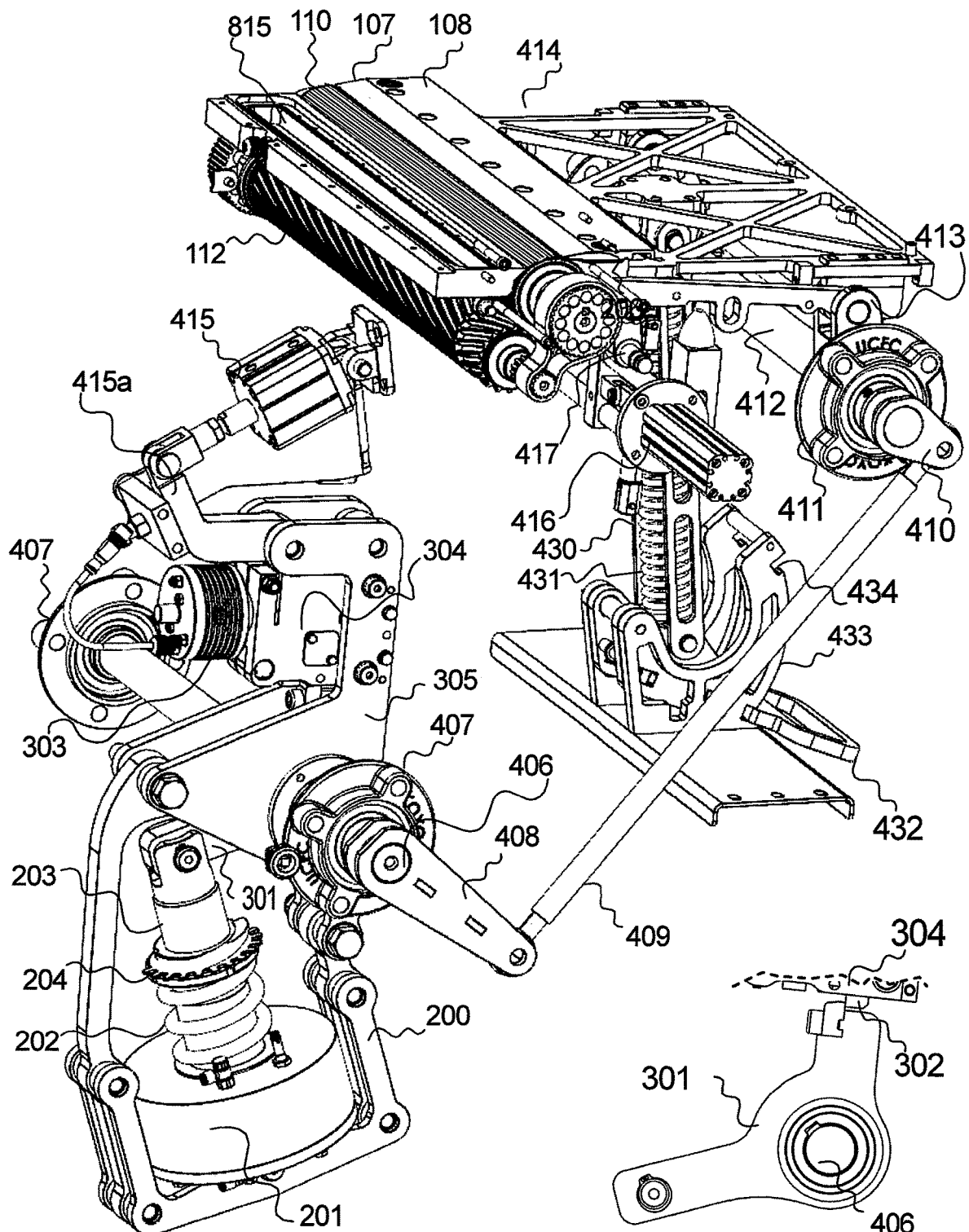
FIG. 4 is an oblique view of the knife retraction mechanism, when in the Safe Position.
FIG. 4a is a detail of the latchable crankshaft arm secured to shaft 406.
Figure 5:
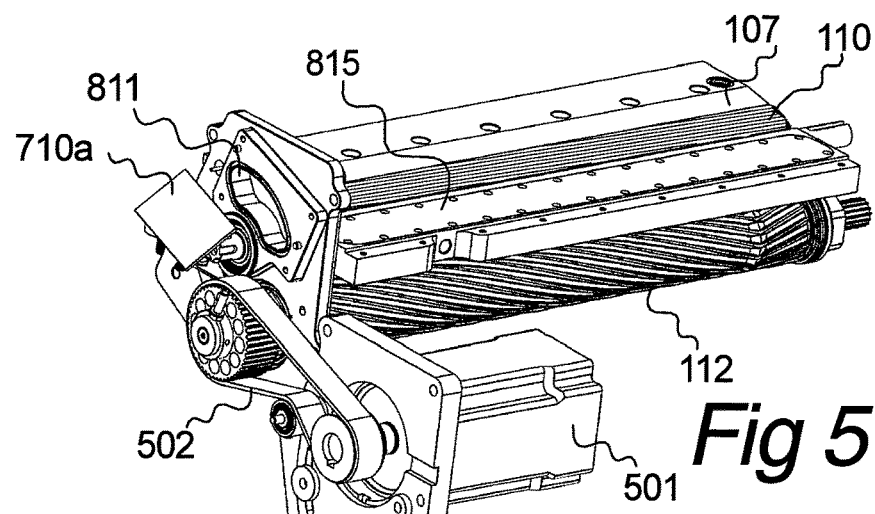
FIG. 5 is a perspective view of the drive motor and rollers, in isolation.
Figure 6:
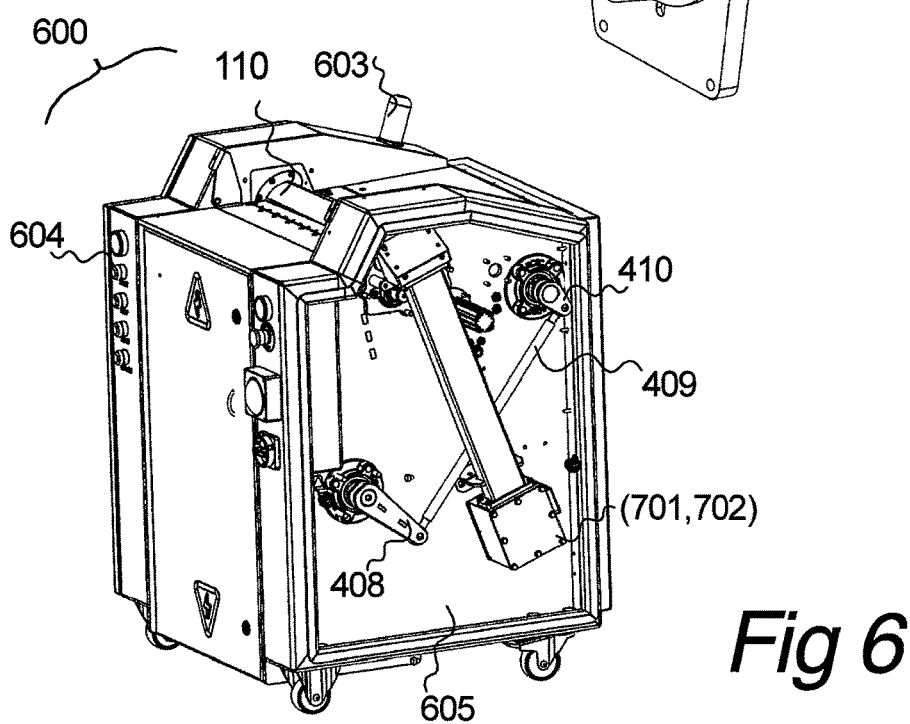
FIG. 6 is an oblique view of the entire skinner machine, with one side cover removed.

The more recent Embodiment 1 is illustrated in FIGS. 1-8. In FIG. 6, a skinner or derinder machine 600 according to the invention is shown in an oblique view. It is complete, except that a side safety cover is off so that part of the structural chassis 605 is visible. An operator position is toward the left, near a plurality of user controls 604. An exposed horizontal working surface is at a convenient height and includes a top portion of a powered gripping roller 110 bearing friction-inducing ridges, teeth or the like in order to carry an article to be skinned away from the operator against a skinner knife 107 (not shown here), situated above the roller. Part of the retraction mechanism: arm 408, beam 409, and second arm 413 are visible. A box (701, 702) containing machine-vision cameras is aligned with a view tunnel. An antenna 603 may be used to communicate machine status to or from a network. The machine includes a "bone bin" (not shown) for cut waste material that had passed between the gripping roller and the blade.

Functionally, there are three modes for the machine, described as "Positions".

Figure 1:
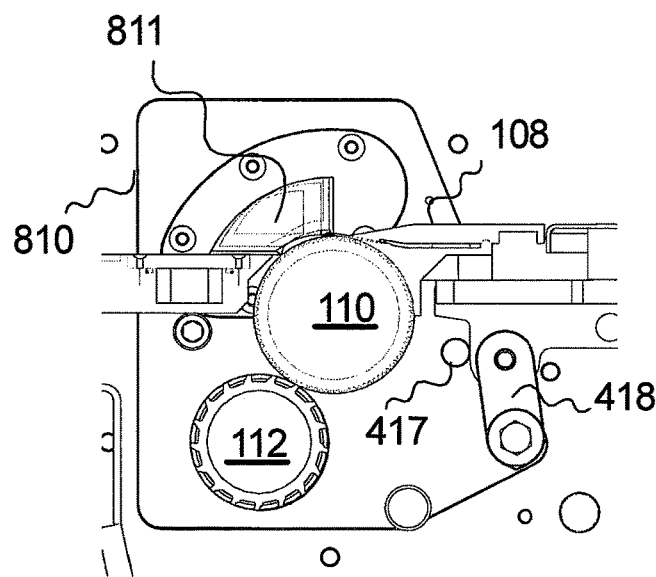
FIG. 1 is a cross-section for Embodiment 1, showing the gripping roller and the blade when in the Run Position.
Figure 1A:
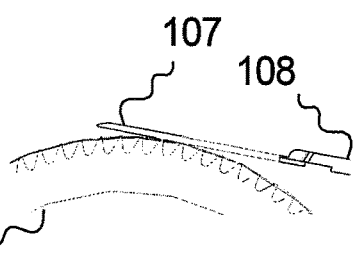
FIG. 1a is a close view of the same.
Figure 2:
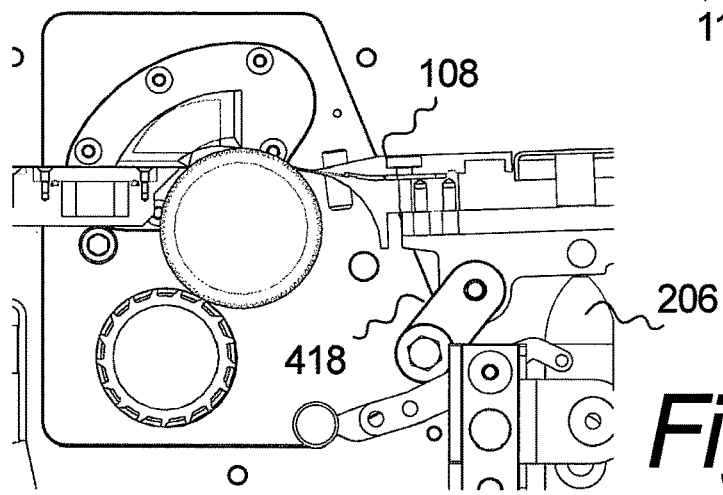
FIG. 2 is a cross-section showing the gripping roller and the blade when in the Safe Position.

"Run Position" describes the machine when in use, in a working mode. FIG. 1 is a cross-section across the roller in a vertical plane and includes part of a blade support 108, the gripping roller 110 and a cleaning roller 112. FIG. 1a is a closer view, clarifying the blade and roller relationship in this mode. The blade is held in a position similar to that of prior-art skinner machines. The position of blade 107 in relation to the gripping roller 110, at about 5 degrees to the incoming side of vertical when in the Run position is shown.

"Safe Position" (FIG. 2) is the post-retraction mode of the apparatus after it abruptly retracts blade 107 away from the operator and holds the blade where damage to the operator is limited. The blade edge is now at about 45 degrees to the right of vertical around the gripping roller, and close to the roller; effectively out of reach. As in the table "Section 1: Timing data" below, the blade started retraction 18 milliseconds after, and has reached the Safe position about 35 milliseconds after one or more cameras have detected the presence of a glove in a surveilled area. That movement provides a fast, effective and reversible transition from Run to Safe Positions.

Figure 3:
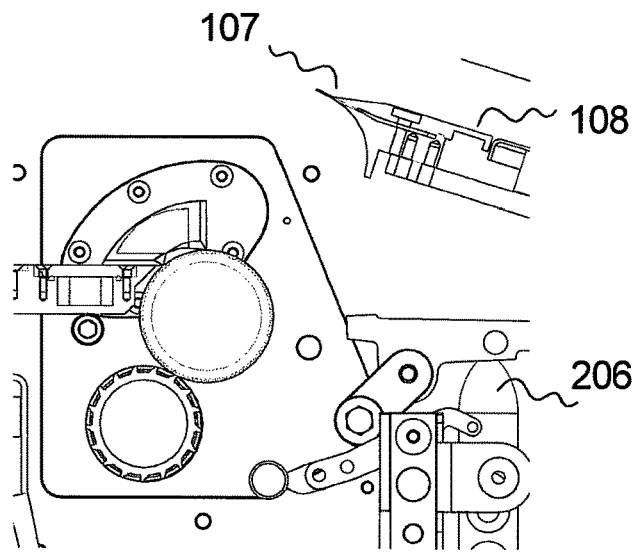
FIG. 3 is a cross-section showing the gripping roller and the blade when in the Clean Position.

"Cleaning Position". FIG. 3 is a cross-section showing the gripping roller 110 and the blade 107 when pivoted and raised high above the roller, in the Cleaning Position. The skinner machine preferably includes safety interlocks so that the handle for physically raising the blade into the extended position as shown can't be accessed until the machine is turned off, rollers have stopped, and the blade has moved into the Safe Position.

A mechanism to provide the Cleaning Position is shown at right in FIG. 4. The knife assembly may be raised on a spring-biased beam 430 supported from a pivotable handle 432 secured to a platform running across the inside of the chassis to an attachment point in the centre of knife support frame 414. The handle 432 may be pulled back out of a first lock position on an arcuate guide plate 433 and swung up, then locked against a second, higher lock position 434 in order to force the knife support frame 414 to pivot away from the edge frame in a locus defined by the arm 413 so that the knife blade is raised and held for maintenance purposes, such as for cleaning the blade or replacing it. The tension spring 431 inside the beam ensures that the knife support frame 414 is pulled downward at all times.

The skinner may be started normally, and stopped normally. On starting, the blade is brought up from the Safe Position to the Run Position while the energy storage mechanism is charged. Once the blade is in the Run Position the skinner is sensitive to operator's hand transgressions and can enter the Safe Position quickly, as described below. When stopped normally, the skinner also quickly enters the Safe Position, so that the blade is no longer exposed, or the energy storage and release mechanism is discharged in another way and rendered safe to maintenance workers.

These timing results from a prototype skinner put the following description of the mechanical design of the invention in context. It is expected that knife retraction will begin within 20 milliseconds after an event is detected by a machine-vision camera. Please note that the data is illustrative but not limiting. Durations may change, or requirements may be relaxed in future versions.

TABLE

CURRENT EXAMPLE TIMING DURATIONS. (all milliseconds)

| Event | Optical glove event | Conductive glove event |
|---|---|---|
| Camera detects hand | 0 | x |
| Vision processing | 3.8 | x |
| SIGNAL releases relay | 10 | 1 |
| Blade retraction starts | 18.3 | 8.3 |

TABLE-continued

CURRENT EXAMPLE TIMING DURATIONS. (all milliseconds)

| Event | Optical glove event | Conductive glove event |
| --- | --- | --- |
| Blade reaches 2 m · sec$^{-1}$ | 24 | 14 |
| Blade finally at Safe Position | 32.5 | 22.55 |
| Roller comes to a halt | 20-25 | 10-15 |

Note 1:
Although the "Conductive glove event" option shows shorter times, that process begins with connection between the operator's glove and the blade; the glove receiving damage thereafter.
Note 2:
The blade accelerates during retraction to about 3 metres per second when frame 416 hits stop 206. It is believed that a velocity over about 2 metres per second will exceed the highest possible velocity of a gloved hand. A curved path is followed.

For the current prototype, a mass of 15 kg is moved by 0.026 meter in a time of 0.014 sec. About 100 Joules at a rate of 7.1 kW are required to accelerate the mass of the blade and its support away from the Run Position after detection of the operator's hand or hands, to reach about 3 metres per second, and enter the retracted or Safe Position.

Blade Retraction.

FIG. 4 is an oblique view of the blade movement mechanism. The enclosing chassis of (for example) 6 mm plate steel, deleted from this drawing, is shown as 605 in FIG. 6. The mechanism illustrates rapid conversion of stored energy held in a compressed spring 202 into kinetic energy as an effective blade retraction movement, while inertia is kept small.

The preferred actuator delivers a consistent power, is repeatedly re-usable and the cost of storing potential energy is low, being the holding current of solenoid 303 while maintaining tooth 302 extended (FIG. 4A). Retraction is a "fail-safe" event. Maintained solenoid power holds the tooth extended. No over-centre mechanism is used in the tooth support. Any event that interrupts the holding current, such as turning off electric power to the skinner machine retracts the tooth 302 and the blade of the skinner will be driven into the Safe Position at the usual velocity by the energy in spring 202. Detection of an operator's hand also interrupts the holding current.

The energy storage and release apparatus is at lower left and is connected by beam 409 to the knife support. Joints allow the solenoid assembly 200 to pivot. The compression spring 202 surrounds a shaft 203 of a pneumatic first actuator 201 used for loading (compressing) the spring which is confined between the actuator body and a collar 204 fixed to the shaft. The shaft is terminated at a clevis and articulated with a latchable crankshaft arm 301 (concealed, but shown in elevation in FIG. 4a). FIG. 4a includes a pivot joint 203a coupled to the clevis of actuator 201, which will transmits the spring energy along a first arm of the item through a keyed joint 406a to rotate shaft 406 once the movable tooth 302 is retracted into the latch mechanism 304 (part shown) and the spring 202 beneath the collar 204 is no longer restrained.

Movement of the tooth 302, extended in FIG. 11 and retracted in FIG. 12, is diagrammatically shown for the earlier embodiment. Details are provided below.

An arm 408 fixed to shaft 406 is pivotally connected to a lower end of a beam 409 passing between the energy storage and release apparatus within the skinner machine and the blade support mechanism that includes the edge frame 416 and the knife support plate 108. Beam 409 is pivotally connected at the upper end to a shorter arm 410 fixed to another transverse rotatable shaft 412 (mostly obscured), supported against the enclosing chassis by bearings 411 at both ends. An arm 413 fixed to shaft 412 is pivotally connected to the edge frame 416.

Figure 4B:
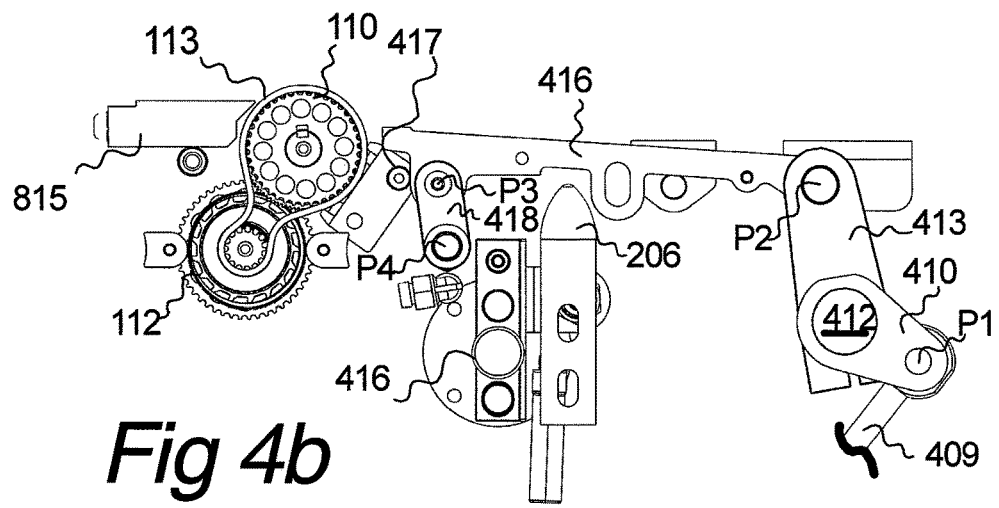
FIG. 4b is an elevation view of the knife support frame, including stops.

FIG. 4b shows details of the knife support, including an edge frame 416 to which a knife support frame 414 is pivotally mounted about pivots P2, to allow for cleaning even though the edge frame 416 is fixed in place. (At left, 815 is the strip light, 110 is the gripping roller, and 112 is the cleaning roller.) The edge frame is present at both sides, for symmetry. The shaft 412 carries retraction motion across the knife support frame. An end of beam 409, at lower right, is pivotally connected at P1 in order to cause arm 410, which is fixed on to transverse shaft 412, to make arm 413, also fixed on the shaft, rotate. Pivot P2 will follow a locus about shaft 412. At the left side of FIG. 5, a downward projection from frame 416 both supports pivot P4 and engages, metal-to-metal, with a stop 417 when the machine enters the Run Position. Pivot P4 traversing the edge frame 416 (as shown in FIG. 4b) is constrained to move in an arc around pivot P3, being connected by a shorter arm 418. All pivots P1-P4 have axes perpendicular to the plane of the drawing. The curved path taken by the blade during retraction is controlled by the pivots at each end of arms 413 and 418. On leaving the Run Position, the blade must move back, to clear the surface of the gripping roller, before moving forward and coming to rest at the Safe Position. Since the Safe Position is close to the gripping roller, a human hand will not have had enough time during blade travel to be trapped under the blade.

When the machine enters the Safe Position, the platform 416 is actively retracted (moved to the right and down) by an impulse delivered through beam 409. The edge frame 416 is prevented from over-retraction by collision with two stops, one of which is shown as 206. These currently are rubber domes, mounted on vertically adjustable supports. They absorb the remainder of the kinetic energy used to cause the machine to enter its Safe Position. Any free play in the linkage back to spring 202 may allow the blade to oscillate about the Safe Position, which is undesirable. Tension in the spring 430 helps prevent oscillation.

When the machine is started or returned to the Run Position, an internal fibre-optic through-beam sensor is used to ensure that the path for subsequent movements is clear. The knife support platform 414 and the blade shall be at the Safe position. The resetting pneumatic actuator 201 is energised, compressing the spring 202. The solenoid 303 power is turned on, through a relay used to buffer and isolate the controller.

Meanwhile, pneumatic actuator 415 pushes the arm 415a outward against part of the chassis. That arm is fixed to a plate 305 supporting the solenoid 303 and its latch assembly 304, which together pivot around shaft 406. Because 304 includes pivotally mounted tooth 302, the motion ensures that the latchable crankshaft arm is rotated so that the tooth is free to enter a holding position behind projection 302a in an extension of latchable crankshaft arm 301, as the Run Position is entered. At least one of the tooth and the projection are preferably made of pieces of a low-friction, strong substance. A second effect of tilting the latch assembly within 305 is that the motion is carried through beam 409 to edge frame 416. An end of the frame 416 becomes pressed against two stops 417, one on each side and fixed to the chassis. The stops 417 provide a precise position for the blade when it enters the Run Position. The tooth 302 is extended while the solenoid is energised and defines the duration of the Run Position. The tooth holds the latchable crankshaft arm 301, which is fixed onto shaft 406, against pressure exerted by the now compressed spring 202. Anti-clockwise rotation with respect to FIG. 4a of shaft 406, coupled through beam 409 to the knife support, causes the blade 107 and blade support to enter the "Run" position (see FIGS. 1 and 2).

Driving and Stopping the Gripping Roller.

Please refer to FIG. 5. Halting the gripping roller is a useful function prior to maintenance, and is a backup for operator safety. The currently preferred option for gripping roller rotation is to use a specialised motor 501 which is a servo-motor having a controller. The selected motor is used to drive the gripping roller at an optimum speed selected in accordance with the material being processed. The Ethernet protocol-controlled motor controller is able to bring rotation to a halt in 10-15 milliseconds of receiving the SIGNAL from the hazard detector. A preferred motor 501 is a type AM8052-3F10 having a power rating of 1.6 kW. (Manufacturer: Beckhoff). The motor is contained within the chassis of the skinner and is coupled to the roller through a toothed rubber belt 502 and belt tensioning pulleys. The motor drives the cleaning roller 112, which in turn drives the gripping roller 110 through another timing belt 113 (FIG. 4b). The cleaning roller is conventional. Low-inertia rollers are preferred. In a derinder, the cleaning roller is not included and belt drive arrangements will be altered accordingly—or the cleaning roller could be replaced by a transverse shaft. FIG. 5 would place the operator toward lower right and includes an elongated well 815 for a strip light; also one of the mirrors 710a and a window 811 used for detection of an operator's hand or hands with machine vision.

Machine Vision

High frame-rate colour video cameras are preferred for detection of unexpected objects within the volume to be surveilled. The machine includes a programmable device (signal processing means) to process the video streams in order to generate an alarm SIGNAL, and manages communications, power-on testing, safety testing, and loading the energy storage and release device. The video components and signal processing means are closely based on the device described in the Applicants' PCT application PCT/NZ2017/050044, the contents of which are incorporated by way of reference. Signal processing steps comprise detection of a contrasting colour or hue within a contiguous group of pixels in the image collected by any one or more of the colour cameras, and generating the SIGNAL if enough pixels are found in one or more cameras. It is common practice in the meat industry at least for operators to wear blue gloves, conveniently providing contrast against the materials being cut. Red gloves might suit woodworking applications.

FIG. 7 is an oblique view of the optical components of the skinner machine as seen by an operator. FIG. 8 is an elevation cross-section A-A from FIG. 7. A pair of cameras is provided at each side of the skinner machine. Each camera 701 and 702 is drawn at the right of FIG. 7, but cameras 703 and 704 are drawn sealed in a case, as (703, 704). Each camera lens (705 and 706 are shown) receives an image through a sealed tunnel 608 (removed at the right side) after deflection by a 45 degrees mirror 710a inside a casing 710, after passage from the volume to be surveilled through a window 811 within a plate 810. The combined surveilled volume is in a sector 812 parallel to and immediately above the gripping roller 110 and extends from above the roller axis to about 50 degrees toward the inward side, at the left of FIG. 8. The height of the surveilled volume 816 may be about 10-35 mm (under software control) so that operator hands, if on a course leading to contact with the knife, start a response, but not if they are safely above the danger area.

The volume to be surveilled is lit by an included high-intensity strip light source sealed inside a trough 815. The extended length of the optical path that is provided by the tunnels helps provide a depth of field such that a glove at the left side or to the right side of the centre of the surveilled volume is also in reasonable focus, and hue information is available at a high quality for discrimination.

Two cameras; one at each side, may suffice, but use of four cameras provides useful backup against problems such as splatter on the windows. It also provides for future development of nearer and farther zoning within the surveilled zone, so that a warning could precede a braking/retraction event. The cost of cameras is small as compared to the cost of injury. Operators should be instructed to clean the windows and the light source. In the absence of hands or material to be skinned, the cameras should see blackness. A "fogging" effect indicates dirty windows.

The antenna 603 (FIG. 6) may be used to (for example) signal an unusually high rate of operator transgressions to a person in charge.

Embodiment 2

This version of a skinner is an earlier prototype of the first embodiment, also including means for stopping the gripping roller and apparatus for optical sensing of gloved hands rather than contact by conductive gloves as the primary trigger event. Both embodiments of the knife retraction mechanism employ the same spring device for internal energy storage and release. The second embodiment assumes a conventional AC induction motor with substantial angular momentum, and provides a coupling device.

This embodiment includes an AC induction electric motor 1006 and a reduction drive arrangement 1005; belts and pulleys. The knife blade 107 is mounted close to the gripping roller 110 surface. The blade edge is parallel to the roller axis of rotation. On detection of a hazardous situation, the invention physically enters a Safe mode, almost instantly withdrawing the blade of the knife 107 into a sheath 108a, while isolating the roller 110 from the induction motor 1006 and applying a brake 52 to the roller. FIGS. 11 and 12 show the Run and Safe modes of this Embodiment in a diagrammatic form as described below.

As in the first Embodiment, an energy storage device optimised for rapid delivery of stored force is used. Spring 202 is held compressed by a releasable tooth 302 when the skinner is in the Run mode (FIG. 11). Shaft 203 is held in a leftward position by the projection 301, which is held against a tooth 302. Tooth 302 is held in place by a latch 304 as long as a solenoid 303 is supplied with a magnetising current. That is a fail-safe configuration. The spring is compressed between an actuator 201 face and a collar 204 attached to a shaft 203. A preferred spring is stiff such that the exerted force drops substantially once the shaft 203 has become extended and the skinner has entered the Safe mode as shown diagrammatically in the second embodiment; FIG. 12.

A two-state power transmission device herein called a "dog brake" including a dog clutch and a local brake, is used at an end of the gripping cylinder 110. It is a combined clutch and brake device 50 for the roller. It has a spindle shape with disk-like ends 58 and 59 separated by a central surface 56. On a first end face 51 there are dog clutch teeth (54 in FIG. 9b) and on second end face 52 there is a braking surface such as pads 52a. may be attached to a of the spindle. (Of course, dog clutch teeth 54 may be replaced by a friction clutch lining). Physical movement of the dog brake as shown in FIGS. 9a and 9b, along a continuously engaged splined shaft, couples the roller of the skinning machine by the internal splines 53 to either the motor, through the teeth 54 or to the brake (opposite surface 52), thereby stopping the roller alone while now disengaged from the motor. The complementary half of the clutch (teeth not shown) is always connected to the pulley 1010 driven by the motor.

An engagement fork 405 pivotally connected to the shaft 203 is positioned in order to force the dog brake 50 to slide axially along the splined axle. The spindle includes an engagement fork contact surface 57 between the end faces, having a first end 55 against which pressure is applied by the fork 405 to cause braking. Surfaces of the fork 405 may be comprised of low-friction rubbing surfaces, or ball bearing units may be used to serve as thrust bearings. The braking end face 52 has a friction-generating surface intended to rub against a facing part of the frame of the machine, and may be comprised of (for example) brake pad composite material, cast iron, the steel frame, a plastics material, or attached sectors of friction-generating brake pads 52a. Dust-free sector pads are preferred for food hygiene reasons. Worn pads can be replaced quickly at the machine by replacing the entire spindle for refurbishment.

The Safe mode begins when the spring 202 is released by withdrawal of tooth 302 by removal of current to solenoid 303. The released energy forces shaft 203, through a linkage, to cause the dog clutch 50 to be pushed by motion of the fork 405 to the other end of its travel, always being connected through the splines 53 to the roller axle. First, the dog clutch teeth 54 are disengaged. Then the second end face 52 is forced by the engagement fork 402 with a braking pressure into frictional contact with a fixed braking surface of the machine. The only rotating parts requiring to be braked are the gripping cylinder 110 with its axle, and the slidably attached dog brake 50. The braking pressure is provided, as in FIG. 12, by the spring 202 coupled through a lever mechanism 401/403 to the engagement fork 405.

The knife mount is shown diagrammatically in FIGS. 11 and 12 as a cross-section through the sheath 108a enclosing the preferred knife 107. Optionally the knife has a curved cross-section as does the sheath, compatible with retraction motion imposed by a pivotally mounted lever. FIG. 13 shows details of the retractable knife mount. Here, 202 is the actuator spring providing power that, when released, quickly pushes the clevis carrying pivot 400 forward. That acts on pivoted beam 402, pivoted around 403. The motion is carried by a transverse rod or pipe 402A across the machine to also move pivoted beam 402R and retract the knife 107 (obscured) into the sheath 108a, in an arcuate motion centered around the transverse rod 402A.

At the same time, motion of the shaft 203 is coupled to the fork at the dog brake 50, putting the diagrammatic arrangement of FIGS. 11 and 12 into effect. Here, 109 and 109A are part of a fixed frame. 1010 is the driven pulley. 50 is the dog brake spindle here shown with the dog clutch teeth engaged. 405 is the engagement fork in its Run position, maintaining the drive from pulley 1010 through the splines 53 and to the roller 101. Pivot 400 (axis shown as a dashed line) through a linkage converts linear motion of beam 401 into a required tilt, for Run or Safe mode, of the engagement fork 405. The portion 109A of the frame also serves as a friction-generating area when the dog brake is moved into its braking position. Spring 202 and reloading actuator 201 await de-energisation of solenoid 304 and withdrawal of the tooth from assembly 303, as previously described in this section.

FIG. 14 illustrates the layout of a series of proposed colour-sensitive optical sensors 1401, 1402, placed so as to detect an object approaching the blade 107. Those may be used to detect proximity of a gloved hand, or a conductive glove arrangement may be preferred, or both as previously described for Embodiment 1.

Hazard detection leads to entry into the Safe mode. The control circuit cuts the current that had been passed through the winding of solenoid 303 while the skinner is in the Run mode whereupon the spring 202 is freed of restraint by the now withdrawn tooth 302 and through the collar 204 forces shaft 203 to extend and mechanically retract the knife and move the dog brake to the braking position. Mechanical contactors, solid-state relays or a variable-speed drive and braking resistor may be used at the same time to cut power to the drive motor. Thanks to decoupling by the dog brake, the roller is brought to rest independently of, and more quickly than the motor and drive.

While shaft 203 is in that leftward position a first lever 401 pivotally mounted at 403 and terminated in an engagement fork 405 holds that fork within a constriction along spindle 50 so that the spindle maintains engagement of spindle dog teeth 54 with a second half of a dog clutch (not shown). In the normal mode the engagement fork need not maintain much pressure in order to maintain dog tooth engagement. But if a friction clutch was used instead of a dog clutch, the clutch will require a holding pressure.

Advantages

1. The skinner has a mechanism capable of anticipating hand trauma, rather than acting only after glove-blade contact has occurred.
2. Blade retraction is sufficiently fast to avoid glove-blade contact.
3. Even if contact sensing with metal mesh gloves is used, fast blade retraction minimises the post-contact damage.
4. The retraction mechanism is compact, cheap, reliable, and may be used many times.
5. The retraction mechanism is easily reset for continued operation after a safety stop. No part of the machine becomes damaged or needs to be replaced following an activation.
6. The safety stop may be used as the normal stop at the end of a shift.
7. The machine operator has full freedom to handle and move the product to be trimmed across the feed roller for optimum performance.

Further Embodiments

The above embodiments share use of a spring which becomes distorted, though of course within its elastic limits, to serve as a store of about 100 Joules of potential energy for rapid delivery. The inventors believe that their perhaps conservative solutions are reliable. For example, the compression spring and the solenoid latch as described have been put through about 50,000 cycles. Some alternative embodiments follow.

The compressible spring could be replaced by a helical spring put under tension by torsion. Perhaps the spring is wrapped around shaft 412 in a compact design having a smaller moving mass. Or a leaf spring, perhaps within the knife support frame 416 could be used, in order to supersede the shaft 409 and the components that drive it. The same pivoted beams and pivots P1-P4 as described in FIG. 4b would be used to control the path taken by the blade during retraction.

Non-elastic options that can provide nearly instantaneous delivery of kinetic energy exist. A standard blank .22 cartridge as used in "Ramset" nail guns holds around 45 J of potential energy. But cartridge replacement and contamination of foods by burnt gases are problems. A cylinder that explodes a charge of an inflammable gas and air (as used for example in gas-powered pruning shears) is possible, though probably not sufficiently safe and reliable.

Some may prefer not to include machine vision and rely on conductive glove proximity testing only. Fast retraction of the blade may be some protection for metal-mesh gloves.

It will be understood by persons skilled in the art that the embodiments described in this specification are to be considered as illustrative and not restrictive.

The invention claimed is:

1. A skinner or derinding machine for shaping an item comprised of meat, fish or poultry material held by an operator's gloved hand or hands; the gloves having a color contrasting with a color of the item; the machine having a chassis, an operator position, two sides and a working surface including a rotatable gripping roller driven by a motor, and a blade supported on a blade mount located parallel to and behind the gripping roller; the item being advanced, when in use, from the operator position at a feed velocity by rotation of the gripping roller while the item is held by the operator against the gripping roller, wherein the machine includes an optical detection apparatus having at least two color cameras and including a signal processing means adapted to interpret the images formed by the cameras and generate a signal to be transmitted to an actuator within a safety apparatus if a gloved hand is detected in any image in unsafe proximity to the blade, the optical detection apparatus disposing said color cameras in order to view a surveilled volume located parallel to an axis of the gripping roller and in front of the blade through a window adjacent each end of the gripping roller; each window is located at a first end of a corresponding sealed tunnel within a side of the machine, each tunnel having a length, each tunnel commencing with an inclined mirror and terminating at a second end to include at least one said camera, each camera having a lens focused into the surveilled volume.

2. The machine as claimed in claim 1, wherein the machine is provided with two cameras at the second end of each tunnel.

3. The machine as claimed in claim 1, wherein the actuator comprises a motor controller that is adapted for controlling rotation of the motor when in use, and of bringing the gripping roller to a halt within 1 milliseconds after receiving the signal from the optical detection apparatus.

4. The machine as claimed in claim 1, wherein the safety apparatus comprises a retraction mechanism; the retraction mechanism is caused by the signal to physically retract the blade from a Run Position in the direction, and at a velocity greater than the feed velocity and place the blade in a Safe Position located behind the gripping roller; so that, when in use, the blade is physically retracted from unsafe proximity to the operator's hand.

5. The machine as claimed in claim 3, wherein the retraction mechanism employs mechanical energy stored within a compression spring fixed at a first end to a body of a first actuator and at a second end to a shaft of the first actuator to physically retract the blade using a mechanical linkage supported from the chassis of the machine and connected between the shaft and the physically retractable blade mount in order to convert motion of the shaft into physical retraction of the blade mount; when in use the compression spring is compressed by the first actuator when entering the Run Position, and is held in compression by a retaining tooth maintained in position by a second actuator; said second actuator being operably connected to the signal derived from the proximity sensing device and being capable of releasing the retaining tooth on receiving the signal.

6. The machine as claimed in claim 3, wherein motion of the blade from the Run Position into the Safe Position commences within 20 milliseconds after the optical detection apparatus detects at least a portion of a hand wearing gloves within the surveilled volume, and is completed within 50 milliseconds.

7. The machine as claimed in claim 1, wherein the machine further includes apparatus responsive to conduction of electricity from any conductive part of the machine, including the blade, through conductive gloves and said apparatus is adapted to thereupon generate the signal to be transmitted to an actuator if a gloved hand is detected to be in contact with the blade.

* * * * *